(12) United States Patent
Anderson et al.

(10) Patent No.: US 11,175,120 B2
(45) Date of Patent: Nov. 16, 2021

(54) DEVICE FOR MEASURING, MARKING, CUTTING, AND SEWING MATERIAL

(71) Applicant: Rulersmith IP, Inc., Shoreline, WA (US)

(72) Inventors: Wade A. Anderson, Shoreline, WA (US); Elmer J. Norgard, Shoreline, WA (US); Edward M. Rifkin, Shoreline, WA (US)

(73) Assignee: Rulersmith IP, Inc, Shoreline, WA (US)

( * ) Notice: Subject to any disclaimer, the term of this patent is extended or adjusted under 35 U.S.C. 154(b) by 5 days.

(21) Appl. No.: 16/770,873

(22) PCT Filed: Dec. 6, 2018

(86) PCT No.: PCT/US2018/064271
§ 371 (c)(1),
(2) Date: Jun. 8, 2020

(87) PCT Pub. No.: WO2019/113330
PCT Pub. Date: Jun. 13, 2019

(65) Prior Publication Data
US 2020/0333121 A1 Oct. 22, 2020

Related U.S. Application Data

(60) Provisional application No. 62/596,570, filed on Dec. 8, 2017.

(51) Int. Cl.
*G01B 3/04* (2006.01)
*B26B 29/06* (2006.01)

(52) U.S. Cl.
CPC .............. *G01B 3/04* (2013.01); *B26B 29/06* (2013.01)

(58) Field of Classification Search
None
See application file for complete search history.

(56) References Cited

U.S. PATENT DOCUMENTS

| | | | | |
|---|---|---|---|---|
| 4,024,831 A * | 5/1977 | Sperling | ................... | B43L 7/00 33/493 |
| 4,779,346 A * | 10/1988 | Schafer | ..................... | B43L 7/00 33/1 B |
| 5,819,422 A * | 10/1998 | Schafer | ................... | D05B 97/12 33/1 B |
| 6,158,135 A * | 12/2000 | Rank | ......................... | B43L 7/00 33/1 B |

(Continued)

*Primary Examiner* — Christopher W Fulton
(74) *Attorney, Agent, or Firm* — Seed Intellectual Property Law Group LLP

(57) ABSTRACT

A device for measuring, marking and cutting material, the device formed of a clear, transparent, translucent or tinted substrate that is either rigid, semi-rigid, flexible or bendable and having in one implementation, a plurality of first and second lines are formed on the substrate to define an unbroken, continuous channel in which a plurality of windows are formed to include a grid line segment to aid in aligning the device with the underlying material. Alternatively or in addition, the device includes one or more visually perceptible invisible lines bounded by opposing line segment pairs and terminal ends to aid in viewing and aligning with underlying material.

12 Claims, 12 Drawing Sheets

(56) References Cited

U.S. PATENT DOCUMENTS

| | | | |
|---|---|---|---|
| 7,032,534 B1* | 4/2006 | Thiemann | B43L 7/005 |
| | | | 116/1 |
| 7,043,850 B2 | 5/2006 | Brady | |
| 7,100,295 B1 | 9/2006 | Chang | |
| 7,127,826 B2 | 10/2006 | Russell | |
| 8,904,661 B1 | 12/2014 | Norgard et al. | |
| 9,809,051 B2 | 11/2017 | Norgard | |
| 2004/0088870 A1* | 5/2004 | Schafer | B26B 29/06 |
| | | | 33/1 B |
| 2006/0130344 A1* | 6/2006 | Schafer | B43L 7/005 |
| | | | 33/1 B |
| 2010/0223798 A1* | 9/2010 | Zimmerman | B43L 7/027 |
| | | | 33/494 |
| 2012/0102771 A1* | 5/2012 | Nethery | B43L 7/027 |
| | | | 33/565 |
| 2014/0109424 A1* | 4/2014 | Left | G01B 3/04 |
| | | | 33/701 |
| 2015/0240400 A1* | 8/2015 | Baker | D05B 97/12 |
| | | | 33/566 |

* cited by examiner

DEVICE FOR MEASURING, MARKING, CUTTING, AND SEWING MATERIAL

CROSS REFERENCE TO RELATED APPLICATION

This application claims the benefit under 35 U.S.C. § 119(e) to U.S. Provisional Application No. 62/596,570 filed Dec. 8, 2017, which application is incorporated by reference herein in its entirety.

BACKGROUND

Technical Field

The present disclosure pertains to rulers, templates, cutting guides, straightedges, measuring sticks, and similar devices that are used in quilting and crafts to facilitate dimensioning, positioning, aligning, sizing, and attaching of two or more pieces of material, such as fabric and cloth and, more particularly, to such devices formed of a clear, transparent, translucent, or tinted platform, such as an acrylic or plastic substrate, that is either rigid, semi-rigid, flexible, or bendable.

DESCRIPTION OF THE RELATED ART

Transparent rulers having grid lines formed thereon are known for use in measuring and marking material, such as fabric, paper, plastic and the like. These rulers are also used to guide a tool, such as a razor, knife, or rotary cutter, in cutting the material to desired sizes and shapes. Most rulers use single color opaque markings for aligning material for measuring and cutting. The opaque line, which is often black in color, interferes with viewing the underlying material, which can cause inaccurate alignment, marking, and cutting. The utilization of a single color line also makes the rulers less versatile for use on light and dark materials.

While some ruler designs have attempted to solve these problems by utilizing lines with multiple, contrasting colors, these markings tend to be wider and provide more interference with viewing the material on which the ruler is placed, which makes it more difficult for a user to visually align the markings with the underlying material. One approach to resolve this additional issue is to use dashed lines or viewing areas in combination with lines. However, if the dashed lines are of a single color they will only be visible on a light or dark material. Further, superimposing the line with a contrasting color improves visibility but again interferes with seeing the underlying material.

Referring to FIG. 1, illustrated therein is a portion of a transparent measuring device having a plurality of horizontal and vertical viewing windows 50 formed in accordance with previous methods. The device has a substrate 32 with opposing first and second sides 34, 35. Selected horizontal and vertical lines are identified by consecutive numbers 40. The numbers 40, preferably of a dark or black color, are positioned within an enlarged circle 42, preferably of a second lighter color. In addition, alignment dots 47 are located in areas 49 between host lines 36, 38, preferably spaced equidistantly apart within each area 49 except on the diagonal in which case they are spaced further apart. Subdivision marks 48 are shown placed at equal intervals on the outside edges along the length and width of the device.

More particularly, the windows 50 are embedded within the host lines 36, 38 so as to be completely surrounded thereby. The windows have a generally rectangular geometric shape outlined with two pairs of dark border lines, such as elongate parallel border lines 52 and transverse parallel border lines 53, which are preferably opaque lines in black or other dark color, such as dark-shade green. Further, each of the host lines 36, 38 is preferably outlined by a dark perimeter line 54 that is identical to or substantially similar in thickness and color to the border lines 52, 53. Between the perimeter line 54 and the border line 52 is an interior area 55 that is preferably colored with a bright transparent color that contracts with the color of the perimeter line 54 to form a composite two-color line.

Further, alternating windows 59 are filled in with the same transparent color as used within the interior area 55 of the host lines 36, 38. This presents a dashed window line appearance within a central longitudinal space 56. In addition, a window 58 formed at the intersection of a vertical line 36 and horizontal line 38 has a "T" shape, which provides additional viewing ability at the junction of the host lines 36, 38.

While using a transparent line or viewing area in combination with lines may help, rulers formed according to previous methods that utilize these alternatives often make it difficult for the user to accurately align the underlying material with the markings surrounding the transparent lines or viewing area.

BRIEF SUMMARY

In accordance with the present disclosure, a device for use in measuring, marking and cutting material is provided that includes a transparent substrate having a first line and a second line formed thereon, the first line in spaced parallel relationship with the second line to define an unbroken, continuous channel, a plurality of third lines formed on the transparent substrate in the channel, the plurality of third lines cooperating with the first line and the second line to form a plurality of visually discernable windows in a contiguous linear arrangement in the continuous channel with each window having a grid line segment formed within the window in spaced relationship with the first line and the second line.

In accordance with another aspect of the present disclosure, the plurality, of third lines are non-linear. In another aspect, the plurality of third lines are perpendicular to the first and second lines. In yet another aspect, the plurality of third lines are at an angle to the first and second lines. In further aspects, the plurality of third lines are connected to the first and second lines. In some aspects, each grid line segment in the respective plurality of visually discernable windows is centered laterally and longitudinally within the respective window without being connected to the plurality of third lines. In other aspects, the grid line segments are one of opaque and tinted colors. In an implementation, the unbroken, continuous channel extends from a peripheral edge of the transparent substrate or a location that is adjacent to the peripheral edge. In yet another aspect, the channel forms a right angle, the channel extending from the peripheral edge or a location adjacent the peripheral edge to a second peripheral edge of the transparent substrate or a second location adjacent the second peripheral edge, the first peripheral edge being different from the second peripheral edge. In other implementations, successive windows of the plurality of visually discernable windows alternate between clear and a tinted color. In some aspects, at least one of the plurality of windows is tinted with a first color. Finally, in an aspect, the grid line segments are formed in spaced parallel relationship with the first line and the second line.

In accordance with the disclosed implementations of the present disclosure, another device for use in measuring, marking and cutting material is provided that includes a substrate having a first surface and a second surface, a transparent line formed on at least one of the first surface and the second surface, the transparent line having an axis, a plurality of first lines formed on at least one of the first surface and the second surface, and a plurality of second lines formed on at least one of the first surface and the second surface in spaced linear relationship with the first plurality of lines, the spaced linear relationship between the first plurality of lines and the second plurality of lines defining boundaries of the transparent line along a length of the axis, the axis intersecting the linear space between the first plurality of lines and the second plurality of lines.

In accordance with a further aspect of the present disclosure, a first end line and a second end line are formed on at least one of the first surface and the second surface, the first end line and the second end line positioned in spaced relationship to define terminal ends of the transparent line. Further, the plurality of first lines and the plurality of second lines are non-linear. Aspects of the present disclosure also include a translucent area surrounding each of the plurality of first lines, the plurality of second lines and the transparent line. In addition, the substrate is at least one of clear, translucent, or transparent to enable viewing underlying material opposite the transparent line. In an implementation, the plurality of first lines and the plurality of second lines are arranged in parallel relationship along the length of the axis.

In accordance with yet another aspect of the present disclosure, another device for use in measuring, marking and cutting material is provided that includes a substrate having first and second mutually opposing surfaces and at least one visually perceptible invisible line formed on at least one of the first and second surfaces, the invisible line having an elongate shape with a longitudinal axis, and a plurality of opposing line segment pairs defining the at least one visually perceptible invisible line with each line segment pair having first and second line segments in spaced relationship to form a space therebetween, the plurality of opposing line segment pairs positioned on the substrate with the spaces arranged in a linear arrangement with the at least one visually perceptible invisible line composed of the spaces.

In accordance with still yet another aspect of the present disclosure, the spaces are one of a transparent, translucent, or tinted color to enable viewing through the spaces on one of the first and second mutually opposing surfaces to the other of the first and second mutually opposing surfaces. In a further aspect, the plurality of opposing line segment pairs are collinear and transverse to the longitudinal axis of the invisible line. In an implementation, first and second terminal lines are formed on at least one of the first and second mutually opposing surfaces, the first and second terminal lines positioned in spaced relationship to define a beginning and an end of the at least one visually perceptible invisible line. Further, at least one of the plurality of opposing line segment pairs are positioned at an angle relative to the longitudinal axis and the first and second line segments of at least one of the plurality of opposing line segments pairs are offset from one another along the longitudinal axis. Finally, a shape of at least one of the plurality of line segment pairs comprises one from among a dot, a circle, a dash, and a composite color line.

As will be readily appreciated from the foregoing, the present disclosure avoids the disadvantages of prior designs by enhancing the ability to view, measure and mark underlying material. The alternating windows outlined by the continuous channel allow the user to see through to the underlying material to enable increased measurement and cutting accuracy. Further, the visually perceptible invisible line and the transparent line in the disclosed implementations provide the user with an unobstructed view of the underlying material along the invisible line or the transparent line, which further increases measurement and cutting accuracy.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with transparent measuring devices; rulers, cutting guides and the inks used thereon as well as manufacturing processes for the same have not been shown or described in order to avoid unnecessarily obscuring descriptions of the implementations.

Throughout the detailed description the word "tint" or "tinted" is used to describe a feature such as an area that is not opaque but formed with a visually perceptible color or hue that is sufficiently clear to enable seeing with the human eye material on which the device is placed. Color or hue is meant to include the three primary colors, the secondary colors, and the tertiary colors. A tinted color is one that has been lighted. Typically this is done by adding white. For the implementations describe herein, a tint is a color that has been lightened to enhance visibility through the tinted area, such as a tinted line. For sake of completeness, a shade is any color or hue in which black has been added to darken the appearance of the color or hue. A tone is a color to which both black and white have been added (essentially adding a grey) so as to tone down the appearance of the color. Finally, the opacity of a color when placed on a transparent substrate is measured on a scale of 0 to 100, with 0% opacity being completely clear and 100% opacity as lacking any clearness or ability to see through the 100% opaque area, such as an opaque line.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

Figure 1:
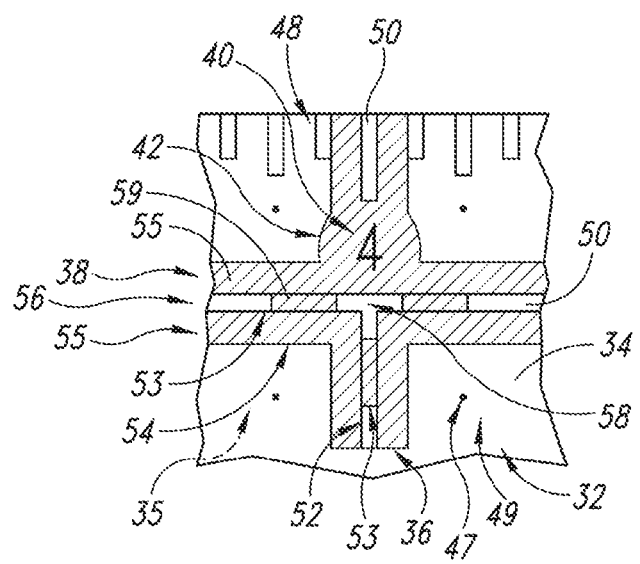
FIG. 1 is a plan view of a known tool that utilizes windows for viewing underlying material.
Figure 2:
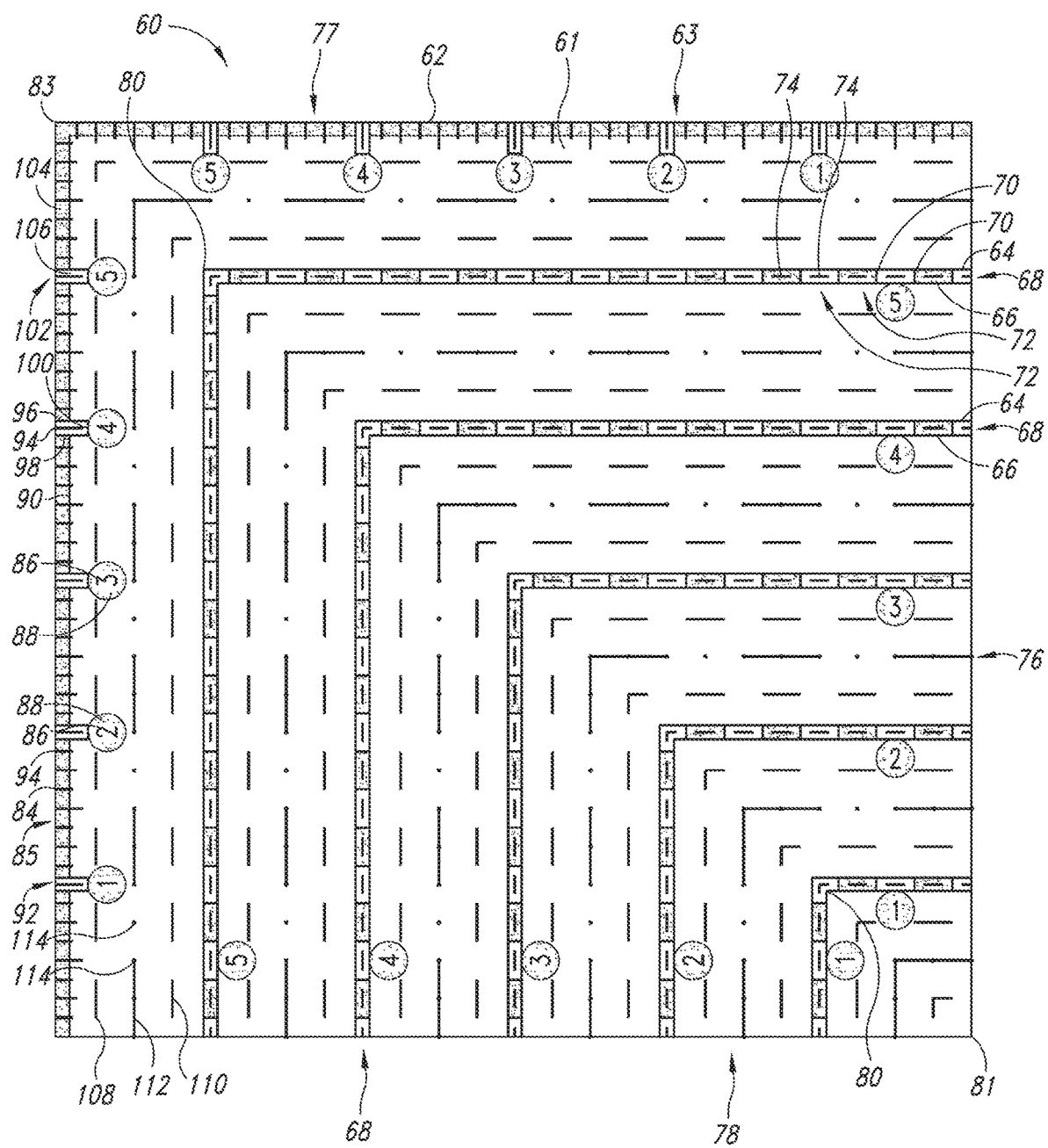
FIG. 2 is a plan view of a device for measuring, marking and cutting material having alternating viewing windows with grid line segments formed in accordance with the present disclosure.

In accordance with the present disclosure, a device 60 for use in measuring, marking and cutting material is shown in FIG. 2 having a substrate 62 having first and second opposing substantially planar sides 61, 63, with a first line 64 and a second line 66 formed on one or the other of the first and second sides 61, 63 of the substrate 62. A line as described herein is preferably a continuous linear indicia. However, a line may also be formed from an arrangement of continual linear segments, such as dashes, dots, or other markings that together form what is perceived by the human eye to be a straight demarcation or line on the substrate 62. In addition, while the lines illustrated and described herein have a linear configuration, it is possible that one or more of the lines could be non-linear, such as circular, arcuate, S-shaped, and other shapes of uniform or varying radius.

In the implementation shown in FIG. 2, the first line 64 and the second line 66 are formed on the substrate 62 (either the first side 61 or the second side 63, or alternatingly the first side 61 for the first line 64 and the second side 63 for the second line 66, or even on both sides 61, 63 simultaneously) in accordance with known methods and may vary in terms of length, width, thickness, color, tint, and opacity. For example, the lines 64, 66 may both be opaque, or one line may be opaque with the other being tinted, or both lines may be formed with the same or different colors. Further, these lines 64, 66 may be solid, dashed, or dotted in whole or in part. In one implementation, the substrate 62 is clear, meaning transparent, so that light can pass through the substrate unimpeded, although in alternative implementations, the substrate is tinted with one or more colors or hues to reduce opacity while presenting a highlighted appearance. Further, the substrate is formed from a preferably clear acrylic material, although it can be appreciated that other known materials suitable for forming the substrate may be chosen.

The first line 64 and the second line 66 are formed in spaced parallel relationship to define an unbroken, continuous channel 68 between the first and second lines 64, 66. The thickness of the first and second lines 64, 66 is preferably uniform and the same, generally in the range of 0.01 inch to and including 0.02 inch. The distance between the first and second lines 64, 66 is preferably in the range of 0.05 inch to and including 0.2 inch. A plurality of third lines 70 are formed on the substrate 62 in the channel 68 that cooperate with the first line 64 and the second line 66 to form a plurality of visually discernable windows 72 in a contiguous linear arrangement in the continuous channel 68. Ideally, the third lines 70 are formed perpendicular to the first and second lines 64, 66, to form rectangular shaped windows 72. However, it is to be understood that the third lines 70 may be formed at other angles to the first and second lines 64, 66 to form other geometric shapes and irregular shapes for one or more of the windows 72. In addition the lines 70 need not be linear but instead can have one or more curves or arcs of uniform or non-uniform radius.

Each window 72 includes a grid line segment 74 formed within the window 72 in spaced relationship with the first line 64 and the second line 66. These features are described in more detail with reference to FIG. 3 below. FIG. 2 also shows that in one aspect of the present disclosure, one or more channels 68 are formed on the substrate 62 wherein each channel 68 has a respective plurality of windows 72 formed thereon according to the present disclosure.

In a further aspect of the present disclosure, the channel 68 extends from a peripheral edge 76 of the transparent substrate 62 or a location that is adjacent to the peripheral edge 76. In this implementation, the channel 68 forms a right angle 80 along its length, with the channel 68 extending from the peripheral edge 76 or a location adjacent the peripheral edge 76 to a second peripheral edge 78 of the transparent substrate or a second location adjacent the second peripheral edge 78. FIG. 2 also depicts multiple channels 68, with the right angles 80 of each channel 68 aligned along an axis that extends from opposing corners 81, 83 of the substrate 62, the right angles 80 may be formed anywhere along the length of the channel 68, or the right angles 80 may be aligned along a different axis or not aligned at all, but rather formed at irregular intervals with respect to each other. It is also possible to form channels with more than one right angle along their length according to the present disclosure. It is also to be appreciated that a number of different angles, such as 45 degrees or 60 degrees can be formed along the length of each channel 68, or that the channel 68 may be curved or semicircular. Accordingly, the present disclosure encompasses a wide variety of arrangements for the lines 64, 66 as well as the channel 68.

In the implementation of FIG. 2, a plurality of tick marks 84 are located along at least one edge 85 of the substrate 62 at regular intervals and in spaced parallel relationship. Preferably the tick marks 84 are oriented perpendicular to the at least one edge 85. The tick marks 84 may be associated with numbers 86, which are preferably of a dark or black color and correspond to the distance of selected tick marks 84 from one of the edges 77, 78 on either end of the adjacent edge 85 of the device 60, as shown in FIG. 2, or from another reference line, such as a center line. The units may be English or metric, although other units may be used. Further, each number may be surrounded by an enlarged circle 88, preferably of a second, lighter color than that of the numbers 86. In addition, a portion of each tick mark 84 may be surrounded by a color strip 90 that extends along the edge 85 of the substrate 62 and having a contrasting color to that of the tick marks 84 to aid with aligning the tick marks 84 with underlying material having a variety of colors. In other words, the color strip 90 is positioned along the entire length or areas of the length of the edge 85 of the substrate 62 such that when tick marks 84 are formed on that same edge 85, the color strip 90 intersects at least one of the tick marks 84. In one implementation, the color of the circle 88, the strip 90, and at least one of the windows 72 is the same. In other implementations, these colors are different or are mixed.

Ideally, a plurality of windows 92 are formed between a respective circle 88 and an adjacent edge 85 of the substrate 62. As compared to the other windows 72 on the substrate 62, the windows 92 are bounded on only three sides, with two lines 96, 98 in spaced parallel relationship and one perpendicular end line 100, remaining side 102 being open at the edge 85 of the substrate 62 to aid in aligning an underlying object or material to be measured or marked. Preferably, the windows 92 are clear and are positioned to separate the color strip 90 so as to form alternating colored regions 104 and clear regions 106 along the edge 85 of the device 60 that allow the device 60 to be used on top of underlying materials having a variety of colors. Each window 92 has a grid line segment 94 that corresponds to a unit of measure represented by the number 86 positioned near each window 92. Each grid line segment 94 is located at a lateral midpoint of the window 92 and consists of a line segment that is parallel to the two lines 96, 98.

A plurality of first line segments 108 and a plurality of second line segments 110 may be formed between the channels 68, or between the channel 68 and the edge 85 of the substrate 62. The plurality of first and second line segments 108, 110 are preferably black or of a dark color and in spaced parallel relationship with each other and each channel 68 and are aligned at a unit of measure from the edge 85 in order to facilitate accurate alignment of the device 60 across the substrate 62 at the specified unit of measure. Preferably a plurality of third line segments 112 are formed between, and in spaced parallel relationship with, the plurality of first and second line segments 108, 110. The plurality of third line segments 112 intersect or connect to one or more alignment dots 114 and are preferably formed of a lighter or contrasting color as compared to the dots 114 and/or the line segments 108, 110. In addition, the one or more alignment dots 114 are preferably spaced equidistant apart, as are the pluralities of first, second, and third line segments 108, 110, 112. However, it is to be appreciated that the first, second, and third line segments 108, 110, 112 can also be non-linear, formed with multiple segments and arranged in irregular intervals or at an angle or various other orientations with respect to one another, as previously described.

Figure 3A:
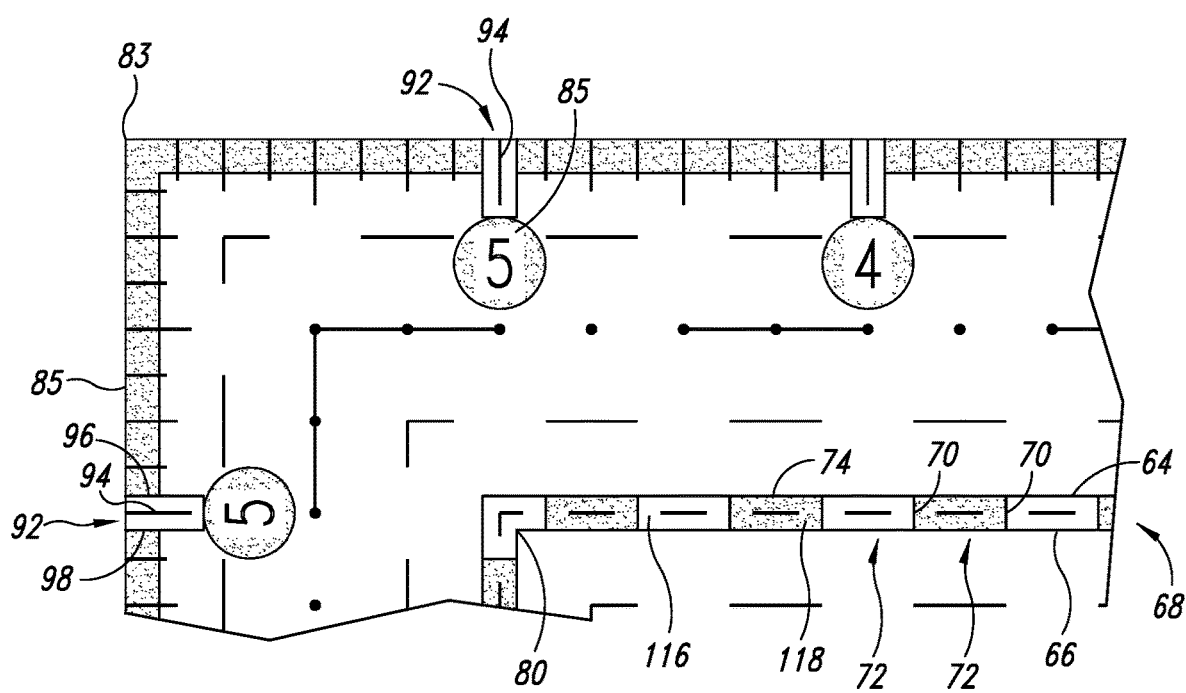
FIGS. 3A-3E are enlarged plan views of a device for measuring, marking and cutting material illustrating alternative implementations of the alternating viewing windows formed in accordance with the present disclosure.

The plurality of visually discernable windows 72 are shown in more detail in the enlarged partial view of FIG. 3A. Each window 72 has a generally rectangular shape bounded by the lines 64, 66 that define each channel 68 and the plurality of third lines 70. In this implementation, the plurality of third lines 70 are perpendicular and connected to the first line 64 and the second line 66, which are in spaced parallel relationship to form the continuous channel 68. Further, each of the windows 72 can be clear, opaque, colored, or tinted. For example, successive windows of the plurality of windows 72 alternate between a clear region 116 and a tinted or colored region 118, which allows the user to easily and accurately see through the substrate 62 to align the windows 72 with multicolored material on which the substrate 62 is placed. In other implementations, successive or alternating windows can be formed with contrasting colors, or different shades or tints of the same color, or at least one window is tinted while the remaining windows remain clear or shaded.

In FIG. 3A, each grid line segment 74 in the respective plurality of visually discernable windows 72 is centered laterally and longitudinally within the respective window without being connected to the plurality of third lines 70. In other implementations, the grid line segments 74 are in spaced parallel relationship with the first line 64 and the second line 66. Similar to the other lines of the various implementations described herein, the grid line segments 74 are either opaque or tinted colors and may also be solid, dashed, or formed of a very light tint. FIG. 3A also illustrates that in certain implementations where each channel 68 has a right angle 80 aligned along an axis that extends between opposing corners 81, 83 of the substrate 62, the grid line segments 74 are positioned along an axis of the channel 68 that aligns with an axis of the grid line segments 94 of the windows 92 along the edge 85, such that the grid line segments 74 represent whole units of measure from ends of the edge 85 across the substrate 62. In a further aspect, the first lines 64 are aligned with the lines 96 that define one side of the windows 92 and similarly, the second lines 66 are aligned with the lines 98 that define a second side of the windows 92.

Figure 3B:
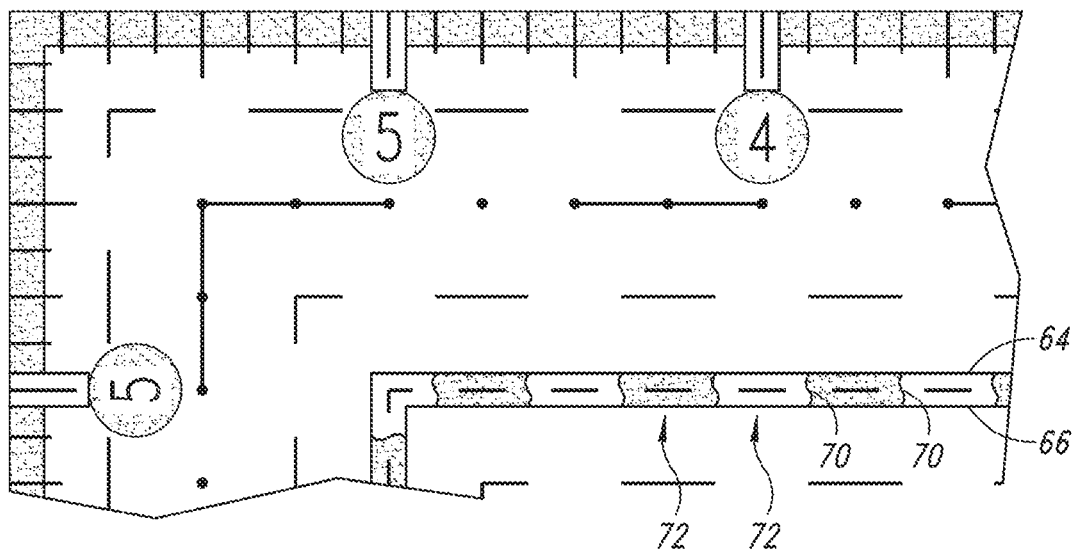
Figure 3C:
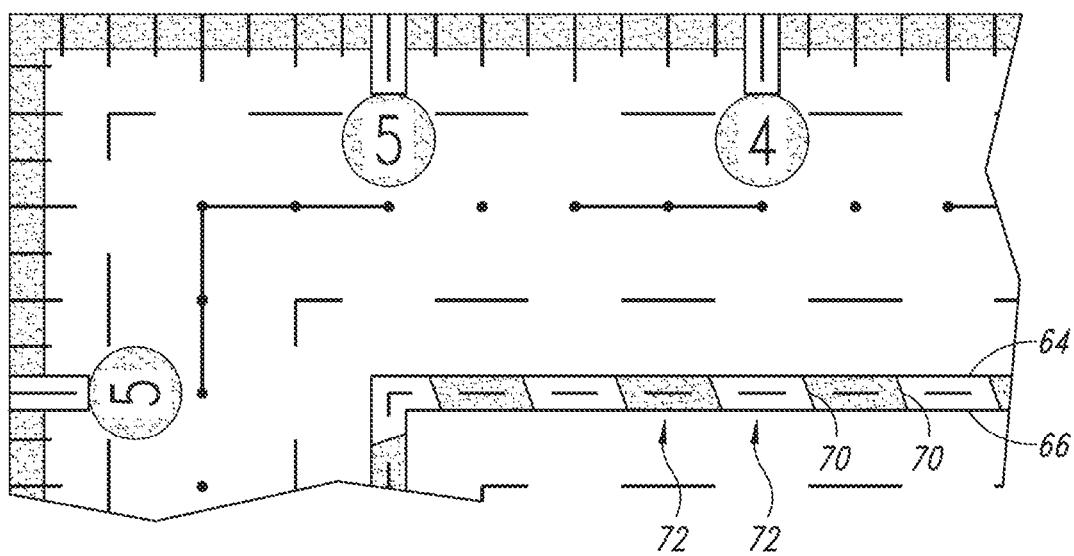
Figure 3D:
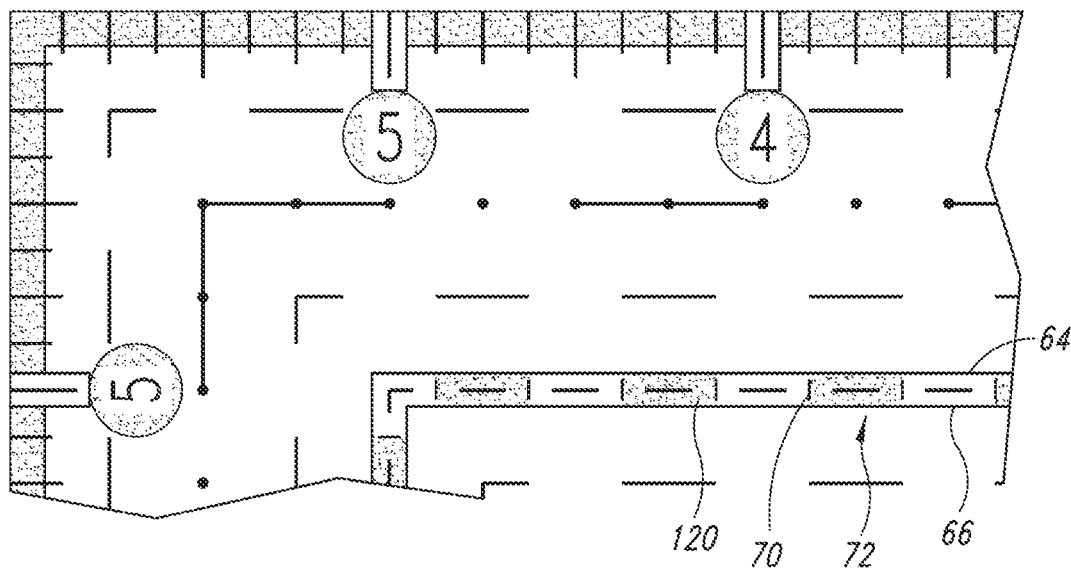

FIGS. 3B-3E illustrate alternative implementations of the plurality of windows 72. In FIG. 3B, the plurality of third lines 70 are non-linear, such that the plurality of windows 72 have a generally polygonal shape with at least one side that is not rectilinear. Further, in FIG. 3C, the plurality of third lines 70 are at an angle to the first and second lines 64, 66 to form windows 72 in the shape of a parallelogram. Although the third lines 70 in this implementation are parallel, it is to be understood that the third lines 70 may also be perpendicular to each other when angled in opposite directions within the same window or at irregular angles with respect to each other and the first and second lines 64, 66. In FIG. 3D, the plurality of third lines 70 are positioned between the lines 64, 66, but not connected to the lines 64, 66. In other words, in some aspects, there is a space 120 between the plurality of third lines 70 and the first and second lines 64, 66, such that visually discernable windows 72 are formed, but each window 72 is not bounded on all sides, which may be advantageous to further enhance the ability to see material and features of material underlying the windows 72.

Figure 3E:
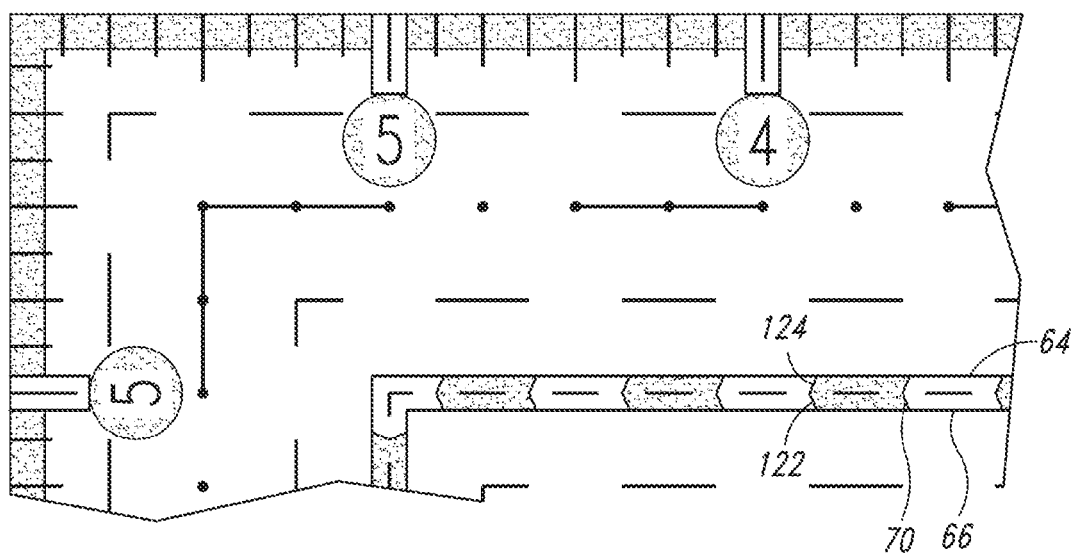

Alternatively, as shown in FIG. 3E, the third lines 70 are formed of more than one line segment, such as segments 122, 124, with at least one of the segments 122, 124 positioned at an angle with respect to the first and second lines 64, 66 and to each other. In any of FIGS. 3A-E, it is also to be appreciated that, as noted above, the lines 64, 66, 70 may also be formed from an arrangement of continual linear segments, such as dashes, dots, or other markings that together form what is perceived by the human eye to be a straight demarcation or line on the substrate 62. In addition, while the lines illustrated and described herein have a linear configuration, it is possible that one or more of the lines could be non-linear, such as circular, arcuate, S-shaped, and other shapes of uniform or varying radius. Accordingly, the windows 72 can be formed with a wide variety of polygonal shapes, including a trapezoidal shape, a triangular shape, a substantially circular shape, a square shape, a rectangular shape, or with irregular shapes, in combination with any one of the above line configurations.

Figure 4:
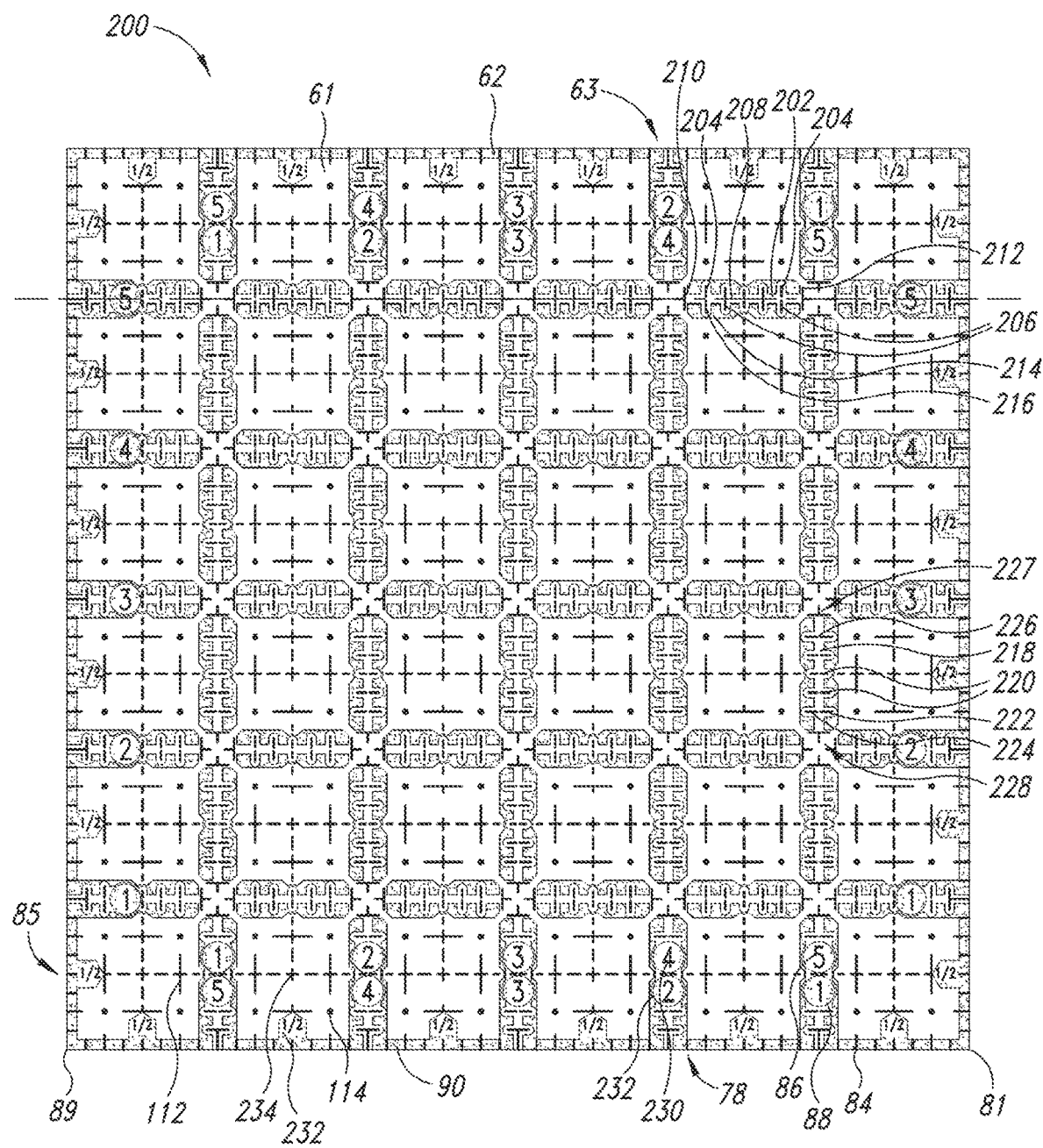
FIG. 4 is a plan view of a device for measuring, marking, and cutting material having a visually perceptible invisible line formed in accordance with the present disclosure.

In accordance with another implementation of the present disclosure, a device 200 for use in measuring, marking and cutting material is shown in FIG. 4 having the substrate 62 with first and second opposing substantially planar sides 61, 63, with a transparent line 202 formed on one or the other of the first and second sides 61, 63 of the substrate 62. The substrate 62 is at least one of clear, translucent, or transparent material to enable a user to view an underlying material or surface opposite the transparent line 202. The transparent line 202 has a longitudinal axis 208 as shown in FIG. 4. The pluralities of first and second lines 204, 206 are formed on one or the other of the opposing sides 61, 63 in spaced linear relationship. The spaced linear relationship between the plurality of first lines 204 and the plurality of second lines 206 defines boundaries of the transparent line 202 along a length of the axis 208.

Although the first lines 204 and the second lines 206 shown in FIG. 4 are linear and in parallel relationship along a length of the axis 208, it is to be understood that the first lines 204 and the second lines 206 can be non-linear, dotted, dashed, or angled with respect to each other, as described in the foregoing implementations. The first and second lines 204, 206 are preferably opaque, such as black or of a dark color.

A first end line 210 and a second end line 212 are preferably formed on at least one of the first surface 61 and the second surface 63, with the first end line 210 and the second end line 212 positioned in spaced relationship to define terminal ends of the transparent line 202.

Ideally, the plurality of first lines 204, the plurality of second lines 206 and the translucent line 202 are surrounded by a translucent area 214 preferably having a different color than the plurality of first lines 204 and the plurality of second lines 206, for example, light, or medium blue. Further, each of the plurality of first lines 204 and the plurality of second lines 206 can be surrounded by a first area 216 of the translucent area 214. While it is possible to view a material underlying the translucent area 214, the first area 216 may be clear or of a contrasting color to the translucent area. 214 to allow a user to more easily align the plurality of first lines 204 and the plurality of second lines 206 with features of a material underlying the device 200.

The substrate 62 may further include at least one visually perceptible invisible line 218 formed on at least one of the first and second surfaces 61, 63. The invisible line 218 has an elongate shape with a longitudinal axis. A plurality of opposing line segment pairs 220 define the at least one visually perceptible invisible line 218 via their arrangement on one of the first and second surfaces 61, 63. For example, each line segment pair 220 includes first and second line segments 222, 224 in spaced relationship to form one or more spaces 226 therebetween wherein the plurality of opposing line segment pairs 220 are positioned on the substrate 62 with the one or more spaces 226 arranged in a linear arrangement that cooperate to present a visually perceptible invisible line. As such, the at least one visually perceptible invisible line 218 is composed of the one or more spaces 226.

The spaces 226 are preferably one of a transparent, translucent, or tinted color to enable viewing through the spaces 226 on one of the first and second mutually opposing surfaces 61, 63 to the other of the first and second mutually opposing surfaces 61, 63. In a further aspect, the plurality of opposing line segment pairs 220 are collinear and transverse to the longitudinal axis of the invisible line 218. Preferably, first and second terminal lines 227, 228 are formed on at least one of the first and second mutually opposing surfaces 61, 63 in spaced relationship to define a beginning and an end of the at least one visually perceptible invisible line 218.

It is also to be understood that while FIG. 4 shows the plurality of opposing line segment pairs 220 positioned transverse to the longitudinal axis, at least one of the plurality of opposing line segment pairs 220 can be positioned at an angle relative to the longitudinal axis, or in other arrangements disclosed herein. Further, the first and second line segments 222, 224 of at least one of the plurality of opposing line segments pairs 220 are offset from one another along the longitudinal axis, although it is also possible for the line segment pairs 222, 224 to be joined to one another to form a unitary line that intersects the longitudinal axis, as will be explained in more detail below. Finally, a shape of at least one of the plurality of line segment pairs 220 preferably comprises one from among a dot, a circle, a dash, and a composite color line.

FIG. 4 also illustrates that it is possible to combine certain aspects of the implementation described above with the implementations described in connection with FIGS. 1-3E. For example, the device 200 can include tick marks 84 formed on at least one of the first and second mutually opposing surfaces 61, 63 and arranged along one or more edges 78, 85 of the substrate 62 in regular intervals and in spaced parallel relationship to one another. The tick marks 84 may be associated with first numbers 86, which are preferably opaque and of a dark or black color and correspond to the distance of selected tick marks 84 from one of the corners 81, 89 on either end of the adjacent edge 78 of the device 200, as shown in FIG. 4, or from another reference line, such as a center line. The units may be English or metric, although other units may be used. Further, each number may be surrounded by an enlarged circle 88, preferably of a second, lighter color than that of the numbers 86.

There are second numbers 230 formed adjacent to the first numbers 86. These second numbers 230 are preferably formed of the second, lighter color used with the enlarged circle 88, although different colors, shades, and tones may be used for the second numbers 230. Each second number 230 is surrounded by a second enlarged circle 232 having a contrasting, or different color than that of the second number 230. The second numbers 230 correspond to the distance of associated tick marks 84 from the opposite corner 81, 89 on either end of the adjacent edge 78 that forms the basis for the first numbers 86. By way of non-limiting example, if a length of the edge 78 was six inches between the corners 81, 89, then one of the first numbers 86 could correspond to a distance of two inches from corner 89, whereas the second number 230 positioned in spaced relationship to that first number 86 would correspond to a distance of 4 inches from the opposite corner 81, This allows the user additional options for measuring and aligning when using the device 200.

In addition, a portion of each tick mark 84 may be surrounded by a color strip 90 that extends along at least one of the edges 78, 85 of the substrate 62, as described above. The color strip 90 may also extend to cover a distance indicator 232 positioned at a predetermined interval between whole units of measure. For example, the distance indicator 232 may correspond to half inch intervals between whole inch indicators represented by the numbers 86, 230. To help aid with alignment of the device 200 at partial units of measure, the alignment dots 114 and the plurality of third line segments 112 may be formed at regular intervals to demarcate partial units of measure or finer graduations across the substrate 62. The device 200 may further include one or more markers 234 centered between the plurality of third lines 112 and the alignment dots 114, such that the markers 234 indicate half units of measure in a horizontal and vertical axis from a given corner of the device 200, such as corner 81 or 89.

Figure 5:
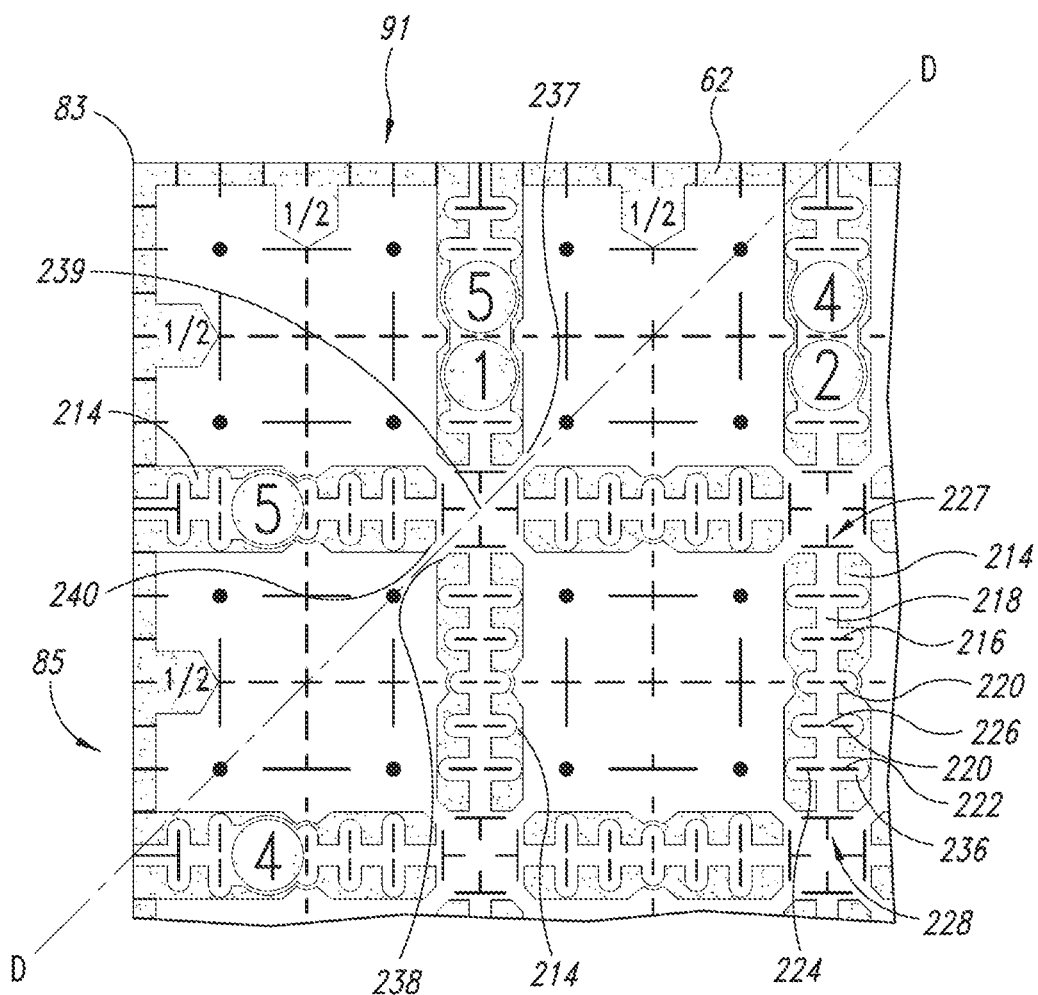
FIG. 5 is an enlarged plan view of a portion of the device of FIG. 4 illustrating the visually perceptible invisible line formed in accordance with the present disclosure in more detail.

FIG. 5 illustrates an enlarged view of a portion of the device 200 showing the visually perceptible invisible line 218 in more detail. The invisible line 218 is formed of the spaces 226 between the pluralities of opposing line segment pairs 220. Each space 226 is formed by the spaced relationship of the first and second line segments 222, 224 that comprise each of the opposing line segment pairs 220. Further, each of the plurality of opposing line segment pairs and the invisible line 218 can be surrounded by the first area 216, which is preferably clear. The first area may be surrounded by a second area 236, which is preferably of a contrasting color, tone or shade to the first area 216. Finally, the first and second areas 216, 236 can be surrounded by the translucent area 214, which preferably has a different color, tone or shade from each of the first and second areas 216, 236. In view of the present disclosure, it is to be appreciated that the each of the first and second areas 216, 236 and the translucent area 214 may all be of the same color, shade or tone, or may have different or contrasting color, shades or tones, or may alternate between clear and colored regions.

FIG. 5 also illustrates that the longitudinal axis of each visually, perceptible invisible line 218 may be aligned with a whole unit of measure. As such, multiple lines will cross at intersections, such as intersection 239, which are positioned at whole units of measure from a certain reference, such as corner 83. The translucent areas 214 surrounding each of the visually perceptible invisible lines 218 may have a size and a shape such that terminal ends 238, 240 of successive areas 214 define a diagonal channel 237 with an axis D, wherein the axis D intersects the edges 85, 91 at whole units of measure. It is also to be appreciated that the lines 218 and the corresponding areas 214 can be formed at different locations on the substrate 62, such that the axis D would terminate at the edges 85, 91 at partial units of measure.

FIGS. 6A-6J illustrate alternative implementations of a line pattern 201 for forming the visually perceptible invisible line 218. Although not specifically shown in each of FIGS. 6A-6H, it is to be appreciated that the first and second areas 216, 236 and the translucent area 214 further aid in delineating the visually perceptible invisible line 218 through use of contrasting colors, or clear regions defining what is perceived by a user's eyes as the line 218 on the substrate 62.

Figure 6A:
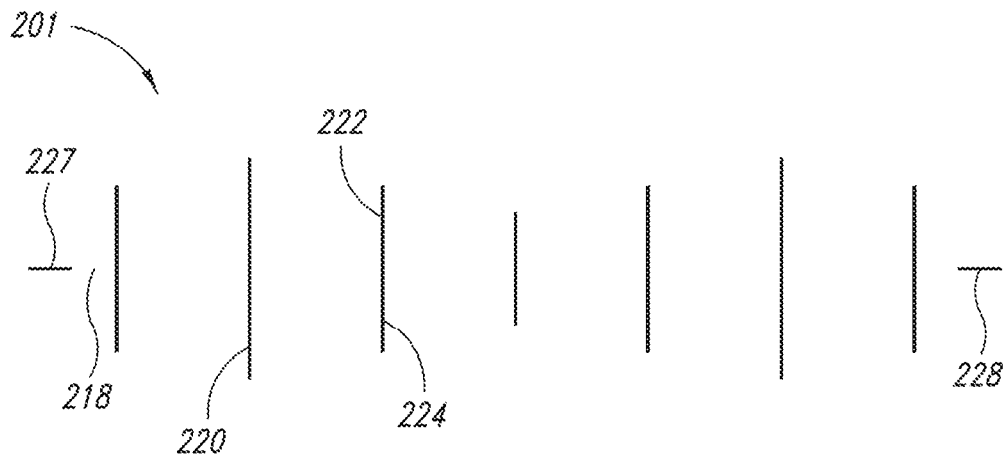
FIGS. 6A-6J are enlarged plan views illustrating alternative implementations of a line pattern for forming the visually perceptible invisible line in accordance with the present disclosure.

FIG. 6A shows an implementation of the line pattern 201 with the visually perceptible invisible line 218 extending between terminal lines 227, 228. The terminal lines 227, 228 are each a single line segment that is positioned in spaced co-linear relationship with the invisible line 218. Further, the first and second line segments 222, 224 are connected, such that each of the plurality of opposing line segment pairs 220 comprise a single line, with no space therebetween. In this implementation, the line 218 may be bounded by a clear region within a colored region to highlight boundaries of the invisible line 218.

Figure 6B:
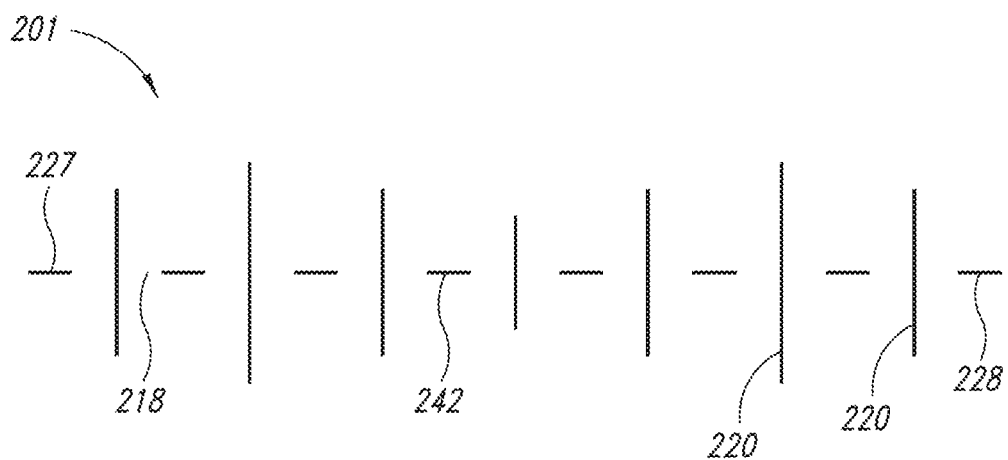

FIG. 6B illustrates another implementation of the line pattern 201 with the visually perceptible invisible line 218 demarcated by a plurality of co-linear grid line segments 242 in spaced relationship between terminal lines 227, 228. There are a plurality of opposing line segments 220 that may have varying lengths. As can be appreciated from the present disclosure in view of the attached drawings, the length of each line segment 220 may vary between successive line segments or the line segments 220 may each have the same length, or successive pairs of line segments 220 may have the same length that is different from the next successive pair of line segments, and so on.

Figure 6C:
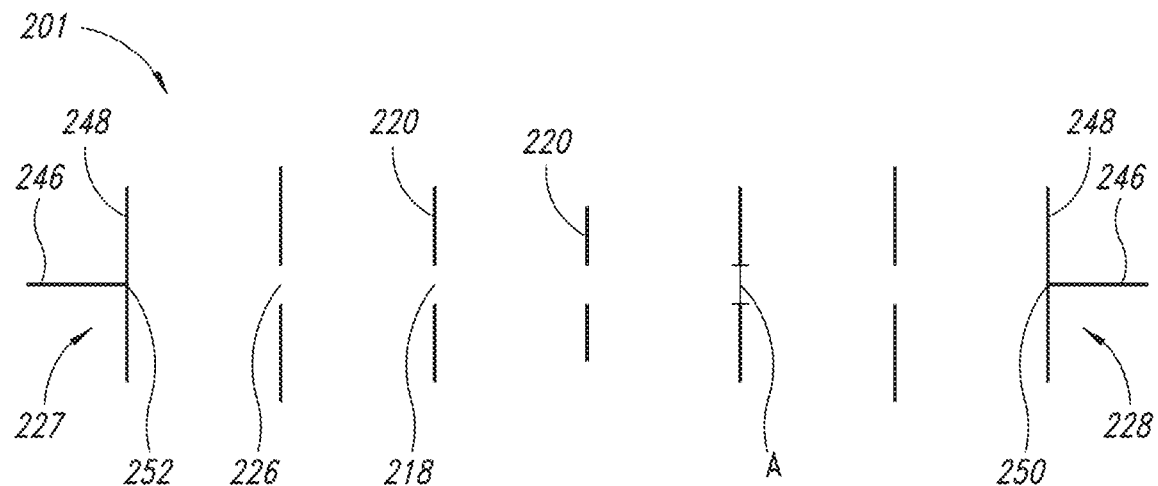

FIG. 6C shows a further implementation of the line pattern 201 with spaces 226 formed in selected line segments 220 to define a visually perceptible invisible line 218, as described above. The line segments 220 are arranged in spaced parallel relationship, such that the invisible line 218 has a longitudinal axis extending between terminal lines 227, 228. Each of the terminal lines 227, 228 is comprised of a first terminal line segment 246 and a perpendicular second terminal line segment 248. As shown, the first terminal line segment 246 is parallel with the longitudinal axis of the invisible line 218 and the second terminal line segment 248 is transverse to the first terminal line segment 246. However, it is also to be understood that the first and second terminal line segments 246, 248 can be at an angle to one another, or formed of additional line segments, as described in other implementations formed in accordance with the present disclosure.

The line pattern 201 can further be arranged with various dimensions between respective lines. For example, a distance between an end 252 of one of the first terminal line segments 246 and an end 250 of the other of the first terminal line segments 246 is preferably 0.73 inches or 0.77 inches, or preferably in the range of 0.60 inches to 0.80 inches. Further, each space 226 preferably comprises a length A between the line segments wherein the distance A is preferably 0.028 inches, or preferably in the range of 0.02 inches to 0.08 inches. Similar ranges and distances can be achieved using the metric, or another, system of measurement. It can also be appreciated that due to the flexibility in arranging the lines that form the line pattern 201, these distances can vary, such that the distances may be outside of the preferred ranges listed above.

Figure 6D:
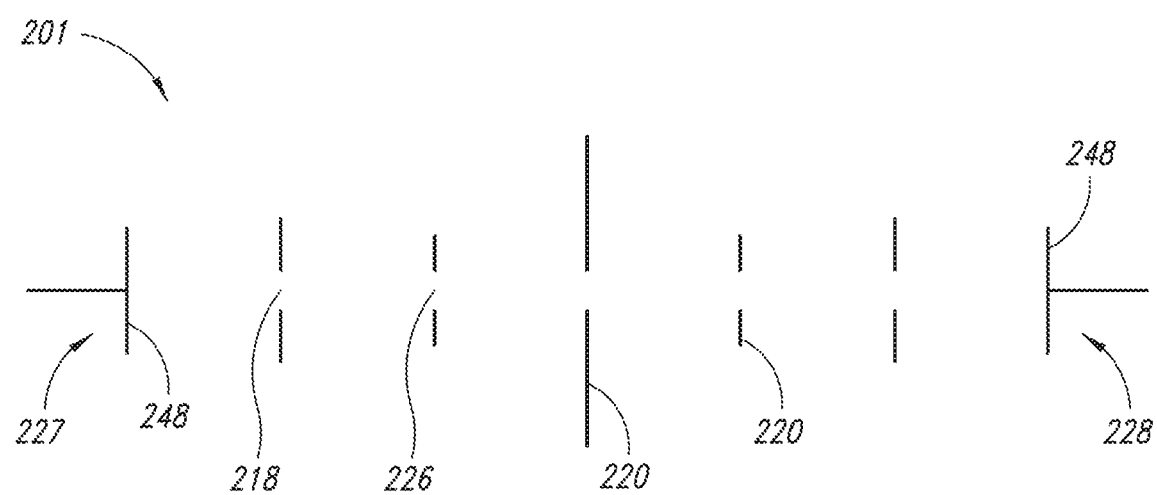

FIG. 6D shows an implementation of the line pattern 201 in which the visually perceptible invisible line 218 is formed via the spaces 226 arranged in spaced co-linear relationship between opposing line segment pairs 220. However, a central line segment pair 220 has a length than is greater than that of any other line segment pair 220 of the plurality of opposing line segment pairs 220. Further, a length of the second terminal line segment 248 of each terminal line 227, 228 may have a length that is greater than, equal to, or less than, a length of any of the plurality of line segment pairs 220.

Figure 6E:
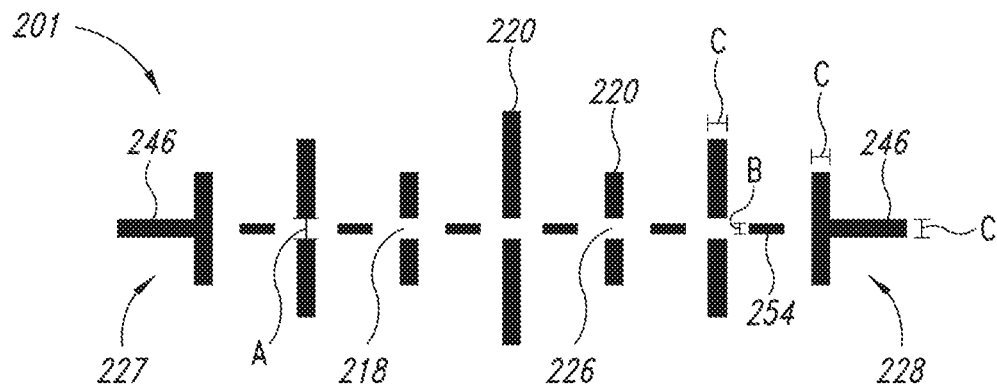

FIG. 6E illustrates an alternative arrangement of the line pattern 201 wherein the plurality of opposing line segment pairs 220 are positioned in spaced parallel relationship to define the space 226 between each line segment pair 220, the spaces 226 arranged along an axis to define boundaries of the visually perceptible invisible line 218. The axis extends between the terminal lines 227, 228, In this implementation, a least a portion, such as the first terminal line segment 246, of each terminal line 227, 228 aligns with the axis. Further, the line pattern 201 can include one or more guide lines 254. Preferably, the guide lines 254 are linear segments formed on the axis of the visually perceptible invisible line 218, and they are positioned between the line segment pairs 220 in an alternating arrangement.

In the implementation shown in FIG. 6E, the guide lines 254 have a line weight or thickness B that is less than a line weight or thickness C of each of the plurality of opposing line segment pairs 220 and the terminal lines 227, 228. In addition, the thickness B of the guide lines 254 is less than the distance A defining the spaces 226 between opposing line segment pairs 220. The one or more guide lines 254 are positioned between successive line segment pairs 220 of the plurality of opposing line segment pairs 220 and adjacent the spaces 226, but do not extend into the spaces 220. Rather, the guide lines 254 create the appearance of a dashed line running along the axis of the invisible line 218, with the dashed line surrounded on all sides by the invisible line 218.

Figure 6F:
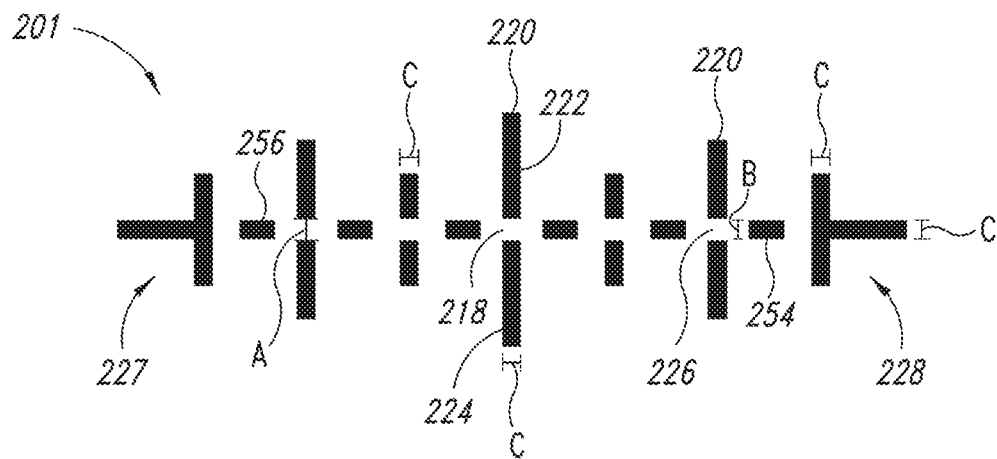

FIG. 6F illustrates the line pattern 201 wherein the weight or thickness B of each guide line 254 is similar to, or the same as, the weight or thickness C of the first and second line segments 222, 224 of each of the plurality of opposing line segment pairs 220 and the terminal lines 227, 228. In addition, the weight or thickness B of each guide line 254 is substantially equal to the distance A between the opposing line segments pairs 220 that defines boundaries of the spaces 226. In this aspect, the invisible line 218 is formed by the space 226 between each opposing pair of line segments 220 and spaces 256 between the guide lines 254 and the remaining portions of the line pattern 201, such as the terminal lines 227, 228. Accordingly, it is to be further appreciated that each of the distances or thicknesses A, B, C may vary in different implementations in order to create a variety of arrangements for the line pattern 201 in which the guide lines 254 are used.

Figure 6G:
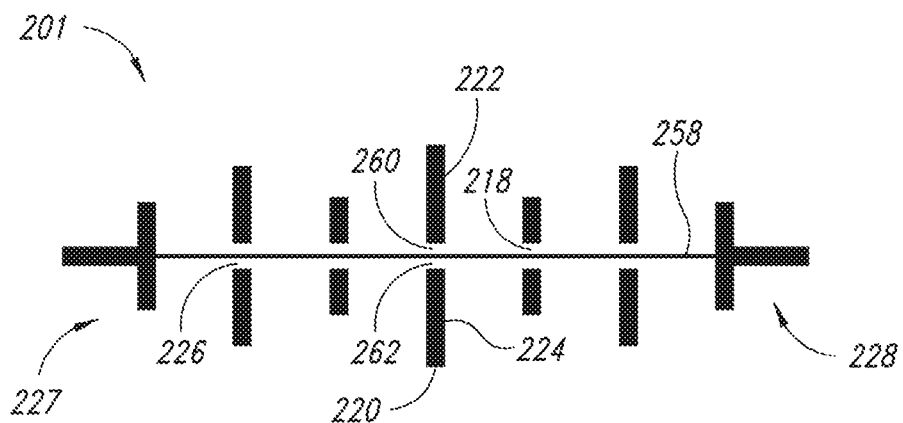

An alternative line pattern 201 is illustrated in FIG. 6G, wherein a continuous thin line 258 runs along the central axis of the invisible line 218 between each terminal line 227, 228. In other words, the thin line 258 extends between and is connected to the terminals lines 227, 228 and intersects the space 226 between each opposing line segment pair 220 of the plurality of opposing line segment pairs 220, such that the invisible line 218 surrounds the thin line 258 on both sides of the thin line 258 and along an entire length of the thin line 258. Because the thin line 258 intersects each space 226, each space 226 is divided into a first space 260 and a second space 262, wherein the invisible line 218 is comprised of the first and second spaces 260, 262 along the length of the thin line 258.

Figure 6H:
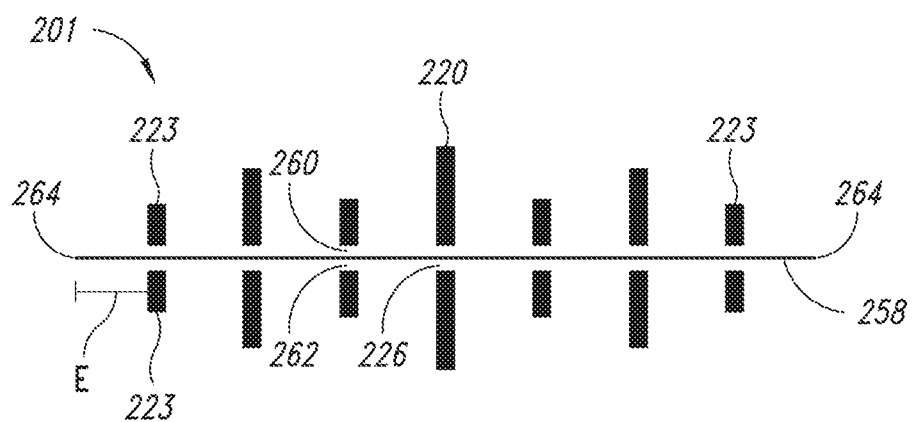
Figure 6I:
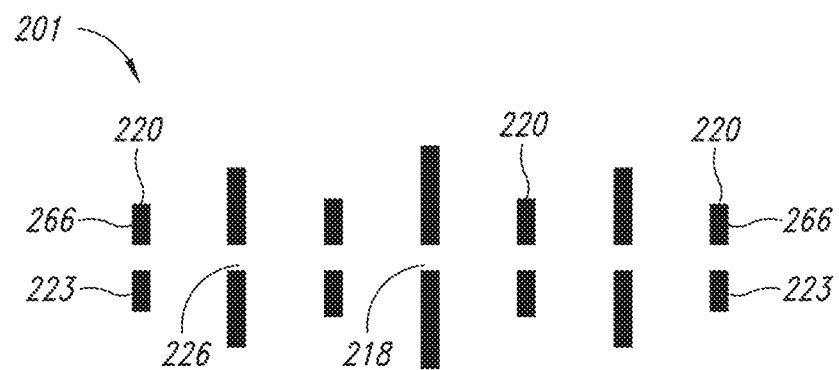

As shown in FIGS. 6H and 6I, terminal lines 227, 228 are not required in the various implementations of the present disclosure. Rather, as illustrated in FIG. 6H, the line pattern 201 includes the thin line 258 intersecting each space 226 between each pair 220 of the plurality of opposing line segment pairs 220 to form the first and second spaces 260, 262. The first and second spaces 260, 262 comprise the visually perceptible invisible line 218 that surrounds the thin line 258 along its length. Rather than terminating at the terminal lines 227, 228, the invisible line 218 terminates at the ends 264 of the thin line 258. Further, the ends 264 of the thin line 258 are not bounded by the terminal lines 227, 228, but rather, can terminate anywhere along the line pattern 201. As shown in FIG. 6H, the thin line 258 terminates at a predetermined distance E from outer pairs 223 of the plurality of opposing line segment pairs 220.

FIG. 6I illustrates the line pattern 201 without the thin line 258 or the terminal lines 227, 228. In this aspect, it is clearly shown that the invisible line 218 can be comprised of only the spaces 226 between each pair of the plurality of opposing line segment pairs 220. Accordingly, the invisible line 218 terminates at an exterior edge 266 of the outer pairs 223 of the opposing line segment pairs 220.

Figure 6J:
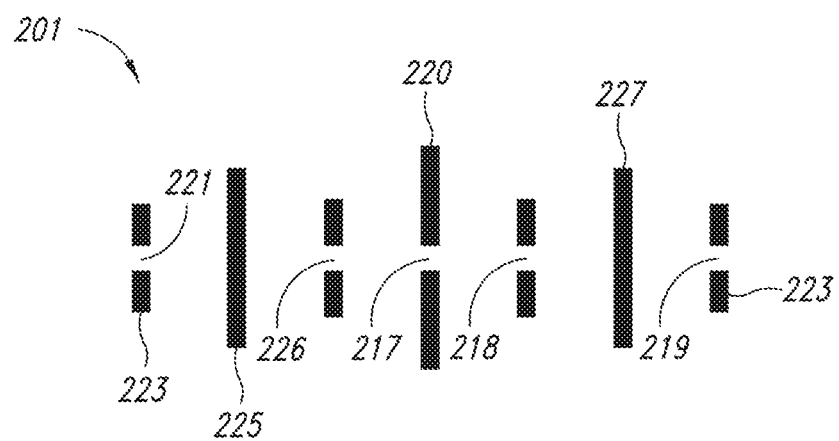

In other implementations, such as the one shown in FIG. 6J, certain features of the disclosed implementations are combined to form the line pattern 201 with at least two pairs of the plurality of opposing line segment pairs 220 connected to form a first and second line 225, 227 that each intersect the invisible line 218. As such, the invisible line 218 comprises a first segment 221, a second segment 217, and a third segment 219. The first segment 221 extends from the first line 225 to an outer pair 223 of the opposing line segment pairs 220 and similarly, the third segment 219 extends from the second line 227 to the other outer pair 223 of the opposing line segment pairs. The second segment 217 extends between the first line 225 and the second line 227. Accordingly, it is be understood that the line pattern 201 can include any number of variations based on the present disclosure, such as the invisible line 218 with more than one segment 221, 217, 219, and a combination of lines 225, 227 and opposing line segment pairs 220 with the space 226 therebetween in the same line pattern 201.

As will be readily appreciated from the foregoing, the present disclosure achieves a device for use in measuring, marking and cutting material that enhances the ability to view, measure and mark underlying material. The alternating windows that are outlined by the continuous channel allow the user to see through to the underlying material in order to provide for increased measurement and cutting accuracy. Further, the visually perceptible invisible line and the transparent line in the disclosed implementations provide the user with an unobstructed view of the underlying material along the invisible line or the transparent line, which further increases measurement and cutting accuracy.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A device for use in measuring, marking, and cutting material, the device comprising:
   a substrate having a first surface and a second surface;
   a transparent line formed on at least one of the first surface and the second surface, the transparent line having an axis;
   a plurality of first lines formed on at least one of the first surface and the second surface;
   a plurality of second lines formed on at least one of the first surface and the second surface in spaced linear relationship with the first plurality of lines, the spaced linear relationship between the plurality of first lines and the plurality of second lines defining boundaries of the transparent line along a length of the axis, the axis intersecting the linear space between the first plurality of lines and the second plurality of lines; and
   a translucent area surrounding the plurality of first lines, the plurality of second lines, and the transparent line.

2. The device of claim 1, further comprising a first end line and a second end line formed on at least one of the first surface and the second surface, the first end line and the second end line positioned in spaced relationship to define terminal ends of the transparent line.

3. The device of claim 2 wherein the plurality of first lines and the plurality of second lines are non-linear.

4. The device of claim 1 wherein the substrate is at least one of clear, translucent or transparent to enable viewing underlying material opposite the transparent line.

5. The device of claim 1 wherein the plurality of first lines and the plurality of second lines are arranged in parallel relationship along the length of the axis.

6. A device for use in measuring, marking, and cutting material, the device comprising:
   a substrate having first and second mutually opposing surfaces and at least one visually perceptible invisible line formed on at least one of the first and second surfaces, the invisible line having an elongate shape with a longitudinal axis;
   a plurality of opposing line segment pairs defining the at least one visually perceptible invisible line, each line segment pair having first and second line segments in spaced relationship to form a space therebetween, the plurality of opposing line segment pairs positioned on the substrate with the spaces arranged in a linear arrangement, the at least one visually perceptible invisible line composed of the spaces; and a first translucent area surrounding each of the first line segments, and a second translucent area surrounding each of the second line segments.

7. The device of claim 6 wherein the spaces are one of a transparent, translucent or tinted color to enable viewing through the spaces on one of the first and second mutually opposing surfaces to the other of the first and second mutually opposing surfaces.

8. The device of claim 6 wherein the plurality of opposing line segment pairs are collinear and transverse to the longitudinal axis of the invisible line.

9. The device of claim 6, further comprising first and second terminal lines formed on at least one of the first and second mutually opposing surfaces, the first and second terminal lines positioned in spaced relationship to define a beginning and an end of the at least one visually perceptible invisible line.

10. The device of claim 9 wherein at least one of the plurality of opposing line segment pairs is at an angle relative to the longitudinal axis.

11. The device of claim 6 wherein the first and second line segments of at least one of the plurality of opposing line segment pairs are offset from one another along the longitudinal axis.

12. The device of claim 6 wherein a shape of at least one of the plurality of line segment pairs comprises one from among a dot, a circle, a dash, and a composite color line.

* * * * *